Oct. 20, 1931.    F. H. THORPE    1,828,164
WOOD ROD COUPLING
Filed Dec. 13, 1929
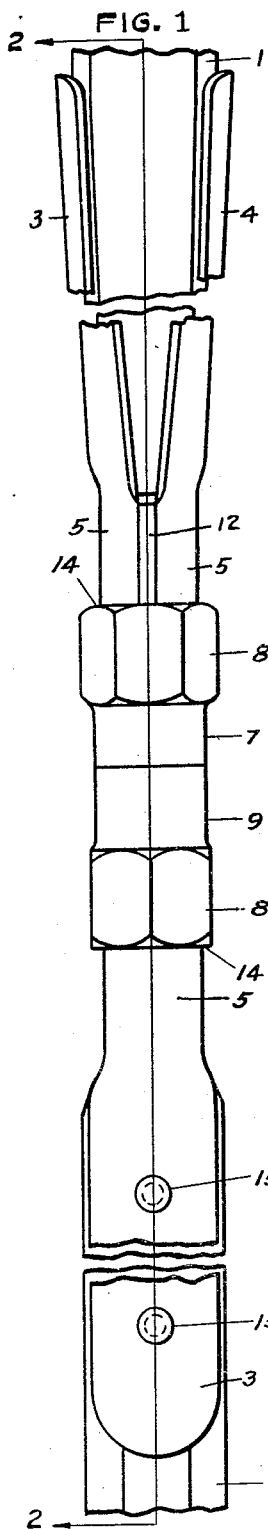
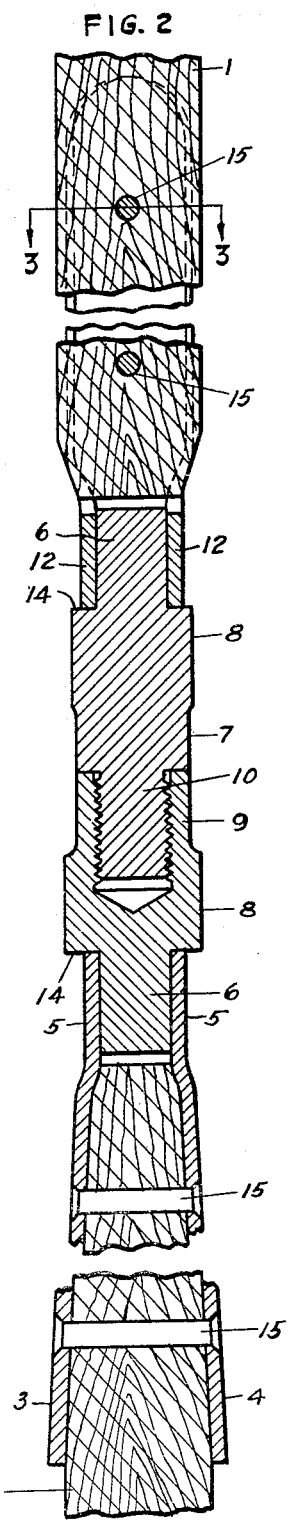
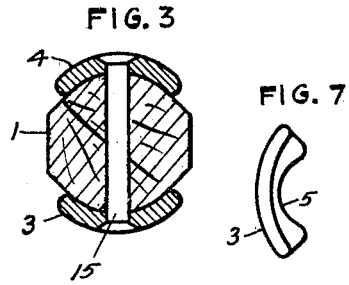
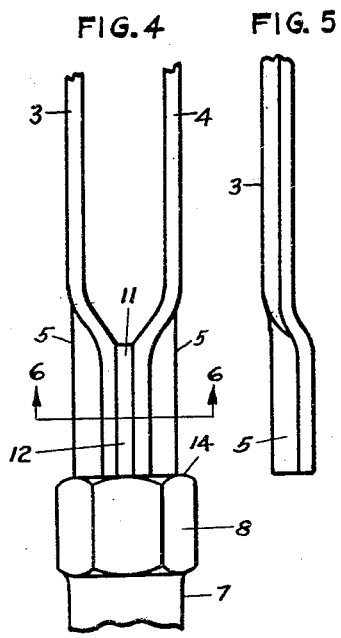
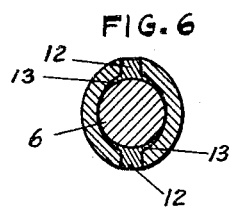
INVENTOR
FOREST H. THORPE.
BY Toulmin & Toulmin
ATTORNEYS Patented Oct. 20, 1931

1,828,164

UNITED STATES PATENT OFFICE

FOREST H. THORPE, OF COLUMBUS, OHIO, ASSIGNOR TO THE COLUMBUS SUCKER ROD COMPANY, OF COLUMBUS, OHIO, A CORPORATION OF OHIO

WOOD ROD COUPLING

Application filed December 13, 1929. Serial No. 413,746.

My invention relates to wood rod couplings for sucker rods.

It is an object of my invention to provide both the method and apparatus in connection with the coupling of the sucker rods which consists of the use of very simple parts that can be cheaply made but which when once assembled will have all of the advantages and rigidity of the expensive and complicated parts.

It is a further object to provide a method of assembly and manufacture of these parts which enables the use of the automatic machines and cheap materials.

Referring to the drawings:—

Figure 1 is a side elevation of the parts showing two rods joined together.

Figure 2 is a section on the line 2—2 thereof.

Figure 3 is a section on the line 3—3 of Figure 2.

Figure 4 is a side elevation of one of the connecting units partially assembled.

Figure 5 is a side elevation of one of the rod-engaging plates.

Figure 6 is a section on the line 6—6 of Figure 4.

Figure 7 is an end elevation of one of the plates such as is shown in Figure 5.

Referring to the drawings in detail, 1 and 2 are wooden rods used in the sucker rod. The invention in question relates particularly to the joining of such rods.

According to my methods I have formed two strips of steel designated 3 and 4 in the semicircular member engaging the sides of the wooden rods 1 or 2. The semi-circular form is more pronounced as these plates approach one another as at 5. When the plates are placed face to face they make a tapering pair of arms for engaging the tapering end of the wooden rod. The ends which approach each other such as 5 are mounted upon the shaft 6 of a block of metal 7 which may be either provided with a hexagon surface 8 and an internally threaded sleeve 9, or with a hexagon surface 8' and a projecting threaded member 10. These parts are turned out on a screw machine in quantities. The two plates 3 and 4 have their semicircular portions 5 mounted on the shaft 6 leaving a space 11 therebetween. This is filled with welded material 12 and the entire structure, comprising the ends 5 and the member 6, is welded together along the line 13 utilizing the welding material 12. An integral structure is thus formed comprising a pair of semicircular diverging arms to form a tapered receptacle for the rod 1, which arms are mounted upon the solid screw machine part which either has the threaded member 10 or the internally threaded sleeve 9, which can receive the member 10. All of the convenience of having pressed metal plates 3 and 4 and the cheapness and convenience of turning out the connecting heads as screw machine parts is preserved with this arrangement, while the welding in the manner indicated forms a rigid and complete structure which is just as solid and substantial as if the parts were made out of one piece. The shoulder 14 serves to align the ends of the plates 5 so that they are perfectly positioned. The ends of the plates 5 may be likewise welded between the shoulders 14.

The plates 3 and 4 are joined by rivets or bolts 15 to the rods 1 or 2.

It will be understood that I desire to comprehend within my invention such modifications as may be clearly embraced within the scope of my claims and invention.

Having thus fully described my invention, what I claim as new and desire to secure by Letters Patent, is:

1. In combination, a sucker rod, oppositely disposed plates connected to said sucker rod, a block of metal having connecting means at one of its ends whereby it may be attached to another block of metal, said block of metal first mentioned having a reduced portion at its other end, said reduced portion being larger than the combined internal surfaces of the ends of said plates which are shaped to conform to said reduced portion, whereby when said plates are placed upon the reduced portion of said block they will engage the major portion of said reduced portion with the side edges of said plates spaced from one another, and welding material located between the adjacent side edges of said plates and uniting the same non-rotatably to the reduced portion of said block and to each other.

2. In combination, a sucker rod, oppositely disposed plates having semi-circular internal end portions and other semi-circular portions connected to said sucker rod, a block of metal having connecting means at one of its ends whereby it may be attached to another block of metal, said block of metal first mentioned having a circular shoulder and a circular reduced portion at its other end, said reduced portion being larger than the combined internal surfaces of the ends of said plates which are shaped to conform to said reduced portion, whereby when the semi-circular end portions of said plates are placed upon the circular reduced portion of said block they will engage the major portion of said reduced portion with the side edges of said plates spaced from one another, and welding material located between the adjacent side edges of said plates and uniting the same non-rotatably to the reduced portion of said block and to each other.

In testimony whereof, I affix my signature.

FOREST H. THORPE.